United States Patent [19]

Fletcher et al.

[11] 3,937,387

[45] Feb. 10, 1976

[54] METHOD OF FLUXLESS BRAZING AND DIFFUSION BONDING OF ALUMINUM CONTAINING COMPONENTS

[76] Inventors: James C. Fletcher, Administrator of the National Aeronautics and Space Administration, with respect to an invention of Aleck B. Featherston, Fort Worth; Kent P. O'Kelly, Arlington, both of Tex.

[22] Filed: Mar. 12, 1974

[21] Appl. No.: 450,500

[52] U.S. Cl. ............... 228/193; 228/206; 228/214; 228/238
[51] Int. Cl.² ............................................ B23K 1/20
[58] Field of Search ............ 29/488, 494, 486, 495; 117/132 C, 49; 148/6.27; 228/193–195, 238, 206, 205, 214

[56] References Cited
UNITED STATES PATENTS

| | | | |
|---|---|---|---|
| 2,537,644 | 1/1951 | Carr | 117/132 C |
| 3,514,842 | 6/1970 | Benyukian | 29/494 |
| 3,555,666 | 1/1971 | Rhee | 29/488 |

*Primary Examiner*—Carl E. Hall
*Attorney, Agent, or Firm*—Carl O. McClenny; John R. Manning; Marvin F. Matthews

[57] ABSTRACT

A method of diffusion bonding and fluxless brazing of aluminum containing components, including a method of preparing aluminum containing surfaces for such welding techniques wherein the aluminum surfaces are freed of any aluminum oxide coating and are coated with a polymeric sealer which can be thermally removed leaving essentially no residue, the polymeric sealer being removed in a substantially oxygen-free environment and the aluminum components then being brazed or diffusion bonded without the use of a flux to remove oxide coating.

18 Claims, No Drawings

METHOD OF FLUXLESS BRAZING AND DIFFUSION BONDING OF ALUMINUM CONTAINING COMPONENTS

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457)

BACKGROUND OF THE INVENTION

1. Field of the Invention

The present invention relates to the welding of aluminum containing components and more specifically, to diffusion bonding or brazing of such components.

2. Brief Description of the Prior Art

Aluminum and aluminum containing metals, i.e., alloys and the like, because of certain physical properties imparted by the aluminum are extremely attractive for fabrication into certain types of components. As is well known, aluminum's high thermal and electrical conductivity, its resistance to corrosion and its inherent reflective properties make it a particularly attractive material for use in construction and fabricating components for heating and cooling systems, heat reflecting surfaces, engine components, etc. In particular, aluminum alloys have found particular application in the fabrication of radiator panels for use in orbiting satellites.

Notwithstanding its desirable properties in many respects, aluminum and its alloys pose peculiar welding difficulties. It is well known that aluminum exposed to the atmosphere will quickly form an aluminum oxide coating which is quite refractory. Indeed, so refractory is the aluminum oxide coating that although the temperature of the aluminum or aluminum alloy may be raised sufficiently to melt the metal, the refractory skin remains as an impervious wall which encases the molten alumimum thus preventing any effective welding technique. Thus, any welding procedure involving aluminum or aluminum alloys calls for the removal of the thin, tough, transparent film of aluminum oxide which protects the surface of the metal.

In the case of aluminum brazing or diffusion bonding, wherein a braze alloy is employed, it is common practice to also use a flux which removes the aluminum oxide from the surfaces to be brazed and permits the formation of a uniform joint having good mechanical strength. However, the use of a flux is not without disadvantage since it is necessary, after the brazing or diffusion bonding, to remove the flux to avoid corrosion of the aluminum.

Another technique which has been employed in welding aluminum and aluminum alloys is to effect removal of the aluminum oxide coating just prior to the welding step. In this technique, there remains the ever present danger that oxide formation might occur before the components are welded together resulting in a non-uniform joint. Furthermore, in a diffusion process when no brazing alloy is employed, conventional techniques require extremely high pressures to effect bonding at the adjoined surfaces to an extent necessary to form a uniform joint of good mechanical strength.

The prior art as exemplified by U.S. Pat. Nos. 2,537,644 and 2,171,545 teaches the use of polymeric materials such as polystyrene and phenol-aldehyde resins as protective coatings for aluminum and aluminum alloys. However, the former patent fails to teach the coating of aluminum oxide free surfaces so as to render the surfaces amenable to fluxless brazing or diffusion bonding and the latter patent, while teaching the removal of aluminum oxide from the surface, employs an etching solution which makes the polymeric coating bond more securely to the surface.

SUMMARY OF THE INVENTION

It is, therefore, an object of the present invention to provide an improved method of preparing an aluminum containing surface for fluxless brazing or diffusion bonding.

Another object of the present invention is to provide a method for the fluxless brazing of aluminum containing parts.

Yet another object of the present invention is to provide a method for the diffusion bonding of aluminum containing parts.

The above and other objects of the present invention will become apparent from the description given herein and the appended claims.

In one embodiment, the above objects are realized by a method in which an aluminum containing surface is treated to remove the aluminum oxide coating and the oxide free surface is then coated with a sealer containing a polymeric material which prevents significant permeation of oxygen to the oxide free surface. The polymeric material is one which, upon application of sufficient heat, is completely vaporized and/or decomposed and thereby removed from the treated surface leaving essentially no residue.

In another embodiment of the invention, a method is provided for the fluxless brazing of aluminum containing parts wherein the surfaces to be brazed are treated as above described. A brazing alloy is then disposed between the surfaces which are to be adjoined and the polymeric sealer is thermally removed in a substantially oxygen-free atmosphere. Following removal of the polymeric sealer, the temperature of the surfaces and the brazing alloy are increased to effect the desired brazing following which the adjoined components are cooled.

In a third embodiment of the present invention, the surfaces, cleaned and coated as described above, are diffusion bonded, with or without a brazing alloy, the diffusion bonding being carried out in much the same fashion as the fluxless brazing with the exception that following initial softening of the adjoining surfaces of the aluminum components or such surfaces and the brazing alloy, if employed, the temperature is reduced and maintained in a predetermined range for a period of time sufficient to effect the diffusion bonding between the aluminum surfaces or if a brazing alloy is employed, between the aluminum surfaces and the brazing alloy disposed there between.

DESCRIPTION OF THE PREFERRED EMBODIMENTS

As used herein, the term welding and variations thereof is intended to mean a localized coalescence of the metals under consideration wherein such coalescence is produced by suitable temperatures, with or without the application of pressure and with or without the use of filler materials such as brazing alloys. Accordingly, as used herein, welding may refer to fluxless brazing, diffusion bonding using a brazing alloy or diffusion bonding in the absence of a brazing alloy.

The present invention in applicable to the welding of all aluminum containing parts and surfaces whether such be pure aluminum or aluminum alloys such as aluminum-copper alloys, aluminum-silicon alloys, aluminum-magnesium alloys, aluminum-iron alloys, aluminum-zinc alloys, aluminum-boron alloys, or indeed any alloy of aluminum and any other metal. Indeed, the process is applicable to the welding of aluminum components or surfaces wherein such surfaces contain pure aluminum and/or an aluminum alloy laminated with a nonaluminum metal.

In preparing the aluminum containing surfaces or parts for fluxless brazing and/or diffusion bonding, the surface(s) to be welded must first be thoroughly cleaned to remove all grease and the aluminum oxide coating. Any common degreasing solvent can be employed to remove residual grease, hand oil, etc., which may be on the surfaces. Suitable degreasing solvents include naphtha, liquid chlorinated hydrocarbons and numerous petroleum distillates.

Removal of the aluminum oxide can be carried out chemically or by mechanical means such as machining, filing, rubbing with steel wool, etc. However, in the preferred embodiment of the present invention, the aluminum oxide coating is removed by a chemical cleaning technique. For example, the surfaces of the aluminum parts to be welded can simply be treated with a hydrochloric acid solution until the evolution of hydrogen is noted indicating that the oxide layer has been removed. A particularly desirable method of removing the aluminum oxide from aluminum containing surfaces is by the use of successive alkali and acid washings. Solutions of virtually any of the alkali metal hydroxides can be employed. A particularly desirable alkali metal hydroxide cleaning solution comprises an aqueous solution of sodium hydroxide and sodium bicarbonate, the sodium hydroxide and sodium bicarbonate being present in amounts ranging from about 1 to about 10 grams each per liter of solution. An aqueous solution containing 5 grams of sodium hydroxide and 5 grams of sodium bicarbonate per liter of solution is an especially desirable caustic cleaning solution.

Following degreasing of the surfaces to be welded, they are contacted with the alkali metal hydroxide cleaning solution at elevated temperatures for a period of from about 1 to 10 minutes, the temperature ranging from about 150° to 200°F. The surfaces are then rinsed with hot (140° to 160°F.) water and are ready for the acid washing.

Practically any mineral acid such as, for example, sulphuric acid, hydrochloric acid, nitric acid, etc., can be employed in the acid washing step. The precise concentration of the acid solution used is not critical, the sole requirement being that there be sufficient acid present to effect dissolution of the aluminum hydroxide formed in the caustic washing. In general, it is preferable to use a dilute acid solution such as, for example, 1/1 concentrated hydrochloric acid in water or an acid solution containing 10% by volume of 42° Bamue nitric acid in water. In general, acid cleaning times of from 1 to 10 minutes are quite sufficient since the reaction between the mineral acid and the aluminum hydroxide is relatively rapid. It is to be understood in the discussion of the cleaning procedure outlined above, that parameters such as temperatures, concentrations of the various cleaning materials, times of cleaning, etc., are not critical, will vary with the amount of aluminum in the surface being cleaned and the area of such surface or surfaces and, accordingly, can be varied within wide limits.

Following the acid treatment, the surfaces of the parts to be welded are rinsed in water, preferably distilled, and the parts immersed or flushed with acetone or some other such organic solvent which is miscible with water and accordingly will effectively remove all water from the surfaces. Immediately following the rinsing with acetone or the like, the surfaces to be welded are coated with the sealer.

The sealer employed in the method of the present invention can be any polymeric material which prevents substantial permeation of oxygen to the surface thus coated and which can be thermally degraded and/or volatilized from the surface leaving essentially no residue. Generally speaking, the sealer will take the form of a suitable polymeric material dissolved in a solvent which in turn can be a mixture of two or more components. Particularly desired polymeric materials for incorporation into the sealer are styrene based polymers which are soluble in aromatic solvents such as benzene and lower monoalkyl benzenes such as, for example, toluene, the xylenes, ethylbenzene, isopropylbenzene, etc. Particularly desirable as a solvent is toluene. The solvent may further include one or more components which are miscible with the aromatic solvents. In this respect, acetone is an ideal candidate being miscible with toluene in all proportions and being easily volatilized. A particularly desirable sealer is one containing polystyrene dissolved in a solvent comprised of toluene and acetone. Generally speaking, when polystyrene is employed as the polymeric material in the sealer, it should be present in an amount of at least 0.5% by weight and amounts ranging from about 0.5 to about 5% by weight provide sealers which coat the surfaces easily and from which the solvent can be easily removed leaving a dried film of the polymer. A most desirable sealer is one having a composition equivalent to 5 grams of polystyrene in 500 milliliters of toluene and 250 milliliters of acetone. It will be apparent that the acetone is added primarily as a viscosity reducing material which, because of its relatively high volatility, can be easily removed from the sealer by evaporation. Accordingly, the ratio of acetone to toluene can vary over wide limits depending on how fast it is desired to remove the solvent from the sealer. In general, when a mixture of acetone or some other such material having similar physical properties is mixed with one of the above-mentioned aromatic solvents, the ratio of the aromatic solvent to the acetone will be from about 1 to 1 to about 3 to 1 by volume. Once the polystyrene sealer has been coated on the surface, the surface is then air or oven dried to remove the solvent leaving the surface coated with a film of polystyrene. It is important in the drying process that the temperature not be raised to a point sufficient to cause degradation or vaporization of the polystyrene as this would remove the protective coating from the surface of the aluminum part rendering it amenable to oxidation.

The aluminum surfaces prepared as above, can be stored for several days prior to use without any appreciable surface oxidation taking place resulting in the formation of aluminum oxide and rendering the surface unsuitable for fluxless brazing or diffusion bonding. While the above discussion has dealt with the surfaces of the aluminum parts, it will be understood that when an aluminum containing brazing alloy is employed, it must also be cleaned and sealed as above.

In carrying out the fluxless brazing procedure of the present invention, the respective aluminum containing parts and the brazing alloy, if it contains aluminum, are cleaned and sealed as described above and are positioned into the desired configuration, with the brazing alloy disposed between the surfaces which are to be brazed. It will be appreciated by those skilled in the art that in all cases wherein a brazing alloy is employed, it will fuse or melt at a lower temperature than the aluminum containing parts being brazed or diffusion bonded. The components can then be clamped or in some other manner held in place and the actual brazing carried out. A particularly desirable method of positioning and holding the respective components is to employ an adhesive coating on the surfaces to be brazed including the brazing alloy, the adhesive serving to hold the components and the brazing alloy in position. When lay-up of the components is complete, pressure is then applied as by weights, clamps or tooling to squeeze out any excessive adhesive between the adjoining surfaces. The adhesive, like the sealer, will contain a polymeric material which, upon application of sufficient heat, will volatilize and/or degrade leaving essentially no residue on the surfaces on which it is coated. While the polymeric material of the adhesive need not be the same as the polymeric material of the sealer, it is desirable that the adhesive polymeric material be one which will be thermally removed at substantially the same temperature as the polymeric material contained in the sealer and in the preferred case will be identical to the polymeric material contained in the sealer. For example, a desirable adhesive can be made from a toluene solution containing at least about 5% by weight polystyrene and preferably containing from about 5 to about 10% by weight polystyrene. As in the case of the sealer, solvents other than toluene such as, for example, benzene and other lower monoalkyl benzenes can be employed. Moreover, mixtures of such solvents can likewise be employed. As in the case of coating with the sealer, once the adhesive has been applied and the components and the brazing alloys positioned and fixed in place, the solvent is removed from the adhesive leaving a dried polystyrene coating which holds the surfaces to be brazed and the brazing alloy in position. It is preferable, when the adhesive is a solution of polystyrene and toluene, that drying or removal of the solvent be carried out in an air oven or the like at between 140° to 160°F. for at least two hours. However, it is to be recognized that the drying temperature and time of the adhesive will depend upon the surface area of the parts to be brazed, the viscosity of the adhesive, the solvent employed, etc.

It should be observed that the sealer itself can function as an adhesive as well as a protective coating if it contains sufficient polymeric materials, e.g., polystyrene, such that when the solvent is evaporated, there will be sufficient residual adhesive-type polymeric material to hold the respective parts together. In the usual case, the components to be welded are cleaned and coated with the sealer as described above, the welding procedure, i.e., the brazing or diffusion bonding, not being carried out immediately thereafter. Therefore, the sealer serves to protect the clean surfaces until the time for the welding to be carried out. Accordingly, it then becomes desirable to employ the adhesive procedure described above during lay-up of the components.

Once the aluminum components and the brazing alloy have been positioned properly, the assemblage is then placed in an autoclave or other suitable heating chamber in which a substantially oxygen-free environment can be achieved, either by evacuating air from the autoclave or by purging it with an inert gas such as nitrogen, argon, helium, etc. The temperature is then raised to a point sufficient to thermally remove the polymeric material whether from the sealer or from the adhesive. In the case of polystyrene, it has been found that a temperature range of from 850° to 925°F. is desirable. The temperature is held in that range until the polystyrene is completely removed from the surfaces of the aluminum containing parts. At all times during removal of the polymer and until the actual brazing is complete, a substantially oxygen-free environment is maintained either by pulling a vacuum on the autoclave or by purging with an inert gas as described above. Once the polymeric coating has been removed from the surfaces, the temperature is then raised to a point sufficient to fuse the brazing alloy causing its adherence to the adjoining surfaces. It will be readily recognized that the temperature range at which the actual brazing is conducted will depend upon the type of brazing alloy employed and the composition of the aluminum component.

In carrying out the fluxless brazing procedure of the present invention, it is, of course, necessary to maintain the surfaces to be brazed and the brazing alloy in intimate contact with one another such that upon fusion of the brazing alloy, good adherence between the adjoined surfaces and the brazing alloy will be effected. However, high pressures need not be exerted to force the surfaces and the brazing alloy together, the pressure being only sufficient to maintain same in intimate contact with one another.

While the brazing technique has been described with reference to the use of an autoclave to supply sufficient heat to effect the brazing, it will be recognized that other forms of achieving brazing temperatures can be employed. However, an autoclave, because it can be easily evacuated with a mechanical vacuum pump or purged with an inert gas to provide a substantially oxygen-free environment, provides a convenient method of carrying out the brazing.

In the diffusion bonding process of the present invention, the surfaces to be bonded and the brazing alloy, if one is employed, are cleaned and coated as above described. Unlike the fluxless brazing procedure, the diffusion bonding procedure requires the application of relatively high pressures forcing the surfaces of the parts to be bonded together, or if a brazing alloy is employed, forcing the surfaces and the brazing alloy together. However, it is one of the advantages of the present invention that unusually high pressures, normally required in ordinary diffusion bonding procedures, are not required. In conventional techniques the excessive pressures are required in order to overcome the barrier posed by the aluminum oxide coating. Since the process of the present invention circumvents that problem, diffusion bonding of aluminum containing components can be carried out at markedly lower pressures and, concomitantly, with less danger of damage to the components being bonded.

The procedure involved in diffusion bonding differs from that of fluxless brazing not only in the utilization of higher pressures but further in the fact that a dual temperature range is employed. Once the parts to be diffusion bonded and the brazing alloy, if one is employed, have been positioned, the polymeric coating is thermally removed in a substantially oxygen-free environment as described above. The temperature is then raised to the point where, if no brazing alloy is used, the surfaces to be adjoined are "softened" sufficiently to ensure intimate contact. The softening of the surfaces referred to herein is not such as to allow the adjoining surfaces to flow easily, i.e., the temperature is kept low enough to avoid fusion of the adjoining surfaces or the remainder of the aluminum components. The temperature is raised to a point where, upon the application of sufficient pressure, the adjoining surfaces will become plastic enough to intimately contact one another. If a brazing alloy is employed, the temperature is raised to the fusion point of the alloy. In either case, the assemblage is then lowered in temperature to a predetermined diffusion temperature range and maintained in that range for a period of time sufficient to permit the diffusion bonding to occur. The diffusion temperature range, as well as the higher temperature at which the alloy is fused or the surfaces softened to effect intimate contact, depends upon the composition of aluminum containing components, the brazing alloy, if one is employed, the pressures exerted, etc. Likewise, the pressure employed in the diffusion bonding process depends upon the composition of the aluminum containing components, the brazing alloy, and the particular configuration of the lay-up.

As noted, diffusion bonding as per the procedure of the present invention involves the application of suitable pressures. While this can be accomplished in many fashions, a convenient method is to form a retort or enclosure into which the parts to be assembled are placed. The retort is constructed such that once the parts to be bonded are placed inside, it can be evacuated to remove substantially all the air or, if necessary, it can be purged with an inert gas such as those mentioned above. The retort is further constructed as such that when it is placed in an autoclave or other suitable heating device, the autoclave can be pressured up with a suitable gas in effect collapsing the retort which in turn exerts pressure upon the aluminum parts therein forcing the latter together. While the retort technique is ideally suited to bonding plies or layers of material, it will be recognized that the use of a retort within an autoclave is simply one method of acheiving the necessary pressure in a substantially oxgenfree environment.

It must be kept in mind as noted above that once the parts have been cleaned and coated and the brazing or diffusion bonding process is being carried out, a substantially oxygen-free environment must be maintained to avoid formation of aluminum oxide coating. Thus, the polymeric coating will be removed at elevated temperatures and in an oxygen-free environment which can be achieved either by the use of a vacuum or by purging with an inert gas and the actual brazing or diffusion bonding will likewise be conducted in an oxygen-free environment.

To more fully demonstrate the present invention, the following non-limiting example is presented:

EXAMPLE

A radiator panel for use in an orbiting space craft was formed by diffusion bonding as follows: a boron/aluminum alloy sheet composite comprised of filaments of boron disposed between thin sheets of 6061 aluminum alloy was employed. The sheet composities were degreased and then cleaned with an aqueous solution containing the equivalent of 5 grams of sodium hydroxide and 5 grams of sodium bicarbonate per liter of solution for approximately 1 to 3 minutes at 165° F. The sheets were then rinsed in hot tap water and cleaned at room temperature in an acid solution containing about 10 volume percent 42° Baume nitric acid in distilled water for 1 to 3 minutes. The sheets were rinsed with distilled water to remove the acid and immediately immersed in acetone for 1 minute to remove any remaining water. The excess acetone was allowed to drain but the panels were not dried. The panels were then immersed into a sealer which had a composition equivalent to 5 grams of polystyrene dissolved in 500 milliliters of toluene and 250 milliliters of acetone. The thus sealed panels were dried to remove the toluene-/acetone solvent. A silicon aluminum alloy foil (brazing alloy) one mil thick and containing 7 ½% silicon was cleaned and sealed as described above. The boron-/aluminum alloy sheet composite and the aluminum silicon alloy were then coated with an adhesive having a composition equivalent to 7 grams of polystyrene per 100 milliliters of toluene, the boron/aluminum alloy sheet composites being positioned with the silicon aluminum alloy therebetween. The excess adhesive was removed by applying pressure and the components clamped into place. The assembly was then dried in a hot air oven at 150°F. for about 2 hours to remove the solvent from the adhesive. To prevent unwanted bonding during the diffusion bonding process, the assemblies were spray coated with a release solution having a composition equivalent to 5 grams of polystyrene in 100 milliliters of toluene and containing 20 grams of powdered calcium carbonate. The adhesive bonded boron/aluminum alloy sheet composites and the silicon aluminum brazing alloy were then placed in a retort.

The retort was sealed except for the provision of orifices for nitrogen purging and/or evacuation. A vacuum was then pulled on the retort which was placed in an autoclave. Upon reaching a temperature of 850° to 900°F., the retort was purged with a nitrogen stream until all of the polymeric material from the sealer and the adhesive had been removed. The retort was then again evacuated and the autoclave pressured to about 200 psig. The temperature of the autoclave was raised to around 1080°F. held for 10 minutes at that temperature and then cooled down in 940°F., the diffusion bonding temperature, and held at the temperature for approximately 3 hours. Finally, power to the autoclave was cut off and the assembly allowed to cool slowly to room temperature. Following this, the retort was disassembled and the diffusion bonded radiator panel removed. The "weld" between the plies of boron-/aluminum alloy sheet composite were found to be uniform and exhibited good mechanical strength properties. Essentially no interfaces between plies of the boron/aluminum alloy sheet composite and the aluminum silicon brazing alloy were discernible.

The present invention has been described with reference to a specific embodiment thereof, and accordingly, it will be apparent that many modifications, substitutions and omissions will be readily suggested to a person of ordinary skill in the art without departing from the spirit of the invention. Therefore, it is to be understood that the scope of the invention is to be determined solely by the appended claims.

We claim:

1. A method for fluxless brazing of aluminum-containing parts wherein said method utilizes an aluminum alloy brazing material, comprising the steps of:
   a. removing the aluminum oxide coating from the surfaces of said brazing alloy and said parts to be brazed;
   b. coating said surfaces with a sealer containing a polymeric material, said polymeric material having the property of preventing significant permeation of oxygen to said surfaces and being thermally removable from said surfaces leaving essentially no residue;
   c. disposing said brazing alloy between the surfaces of said parts to be brazed;
   d. bringing said surfaces of said parts to be brazed into intimate contact with said brazing alloy;
   e. subjecting said surfaces, in a substantially oxygen free environment, to a temperature sufficient to thermally remove all of said polymeric material from said surfaces;
   f. heating said surfaces and said brazing alloy, in said substantially oxygen free environment, to a temperature sufficient to cause fusion of said brazing alloy and adherence of said surfaces; and
   g. cooling said thus brazed parts.

2. The method of claim 1 wherein said sealer comprises said polymeric material dissolved in a suitable solvent and said solvent is evaporated leaving a coating of said polymeric material on said surfaces.

3. The method of claim 2 wherein said polymeric material comprises polystyrene and said solvent comprises toluene.

4. The method of claim 3 wherein said polystyrene is present in an amount of from about 0.5 to about 5% by weight.

5. The method of claim 4 wherein said solvent further includes acetone.

6. The method of claim 2 wherein said polymeric material coated surfaces are further coated with an adhesive containing an adhesive polymeric material, said adhesive polymeric material having the property of being thermally removable form said surfaces leaving essentially no residue and being thermally removable at substantially the same temperature at which said polymeric material in said sealer is removed, said adhesive material serving to hold said respective parts and said brazing alloy in position prior to said brazing.

7. The method of claim 6 wherein said adhesive polymeric material is the same as said polymeric material in said sealer.

8. The method of claim 7 wherein said adhesive contains an adhesive solvent for said adhesive polymeric material and adhesive solvent is removed prior to thermal removal of said adhesive polymeric material.

9. The method of claim 8 wherein said adhesive solvent comprises toluene and said adhesive polymeric material comprises polystyrene present in an amount of from about 5 to about 10% by weight.

10. A method of diffusion bonding aluminum-containing parts comprising the steps of
    a. removing the aluminum oxide coating from the surfaces of said parts to be diffusion bonded;
    b. coating said surfaces with a sealer containing a polymeric material, said polymeric material having the property of preventing significant permeation of oxygen to said surfaces and being thermally removable from said surfaces leaving essentially no residue;
    c. bringing said surfaces of said parts to be diffusion bonded into contact with one another;
    d. subjecting said surfaces, in a substantially oxygen-free environment, to a first temperature sufficient to thermally remove all of said polymeric material from said surfaces;
    e. heating said surfaces, under pressure and in a substantially oxygen-free environment, to a second temperature which is high enough to cause said surfaces to soften but low enough to prevent fusion thereof and causing said surfaces while heated to said second temperature to intimately contact each other;
    f. cooling said surfaces to a third temperature which is in a predetermined diffusion temperature range which is sufficient to cause diffusion bonding of said surfaces with each other;
    g. maintaining said third temperature for a period of time sufficient to effect said diffusion bonding; and
    h. further cooling said thus diffusion bonded parts.

11. The method of claim 10 wherein said sealer comprises said polymeric material dissolved in a suitable solvent and said solvent is evaporated leaving a coating of said polymeric material on said surfaces.

12. The method of claim 11 wherein said polymeric material comprises polystyrene and said solvent comprises toluene.

13. The method of claim 12 wherein said polystyrene is present in an amount of from about 0.5 to about 5% by weight.

14. The method of claim 13 wherein said solvent further includes acetone.

15. The method of claim 11 wherein said polymeric material coated surfaces are further coated with an adhesive containing an adhesive polymeric material, said adhesive polymeric material having the property of being thermally removable from said surfaces leaving essentially no residue and being thermally removable at substantially the same temperature at which said polymeric material in said sealer is removed, said adhesive material serving to hold said respective parts and said brazing alloy in position prior to said diffusion bonding.

16. The method of claim 15 wherein said adhesive polymeric material is the same as said polymeric material in said sealer.

17. The method of claim 16 wherein said adhesive contains an adhesive solvent for said adhesive polymeric material and said adhesive solvent is removed prior to thermal removal of said adhesive polymeric material.

18. The method of claim 17 wherein said adhesive solvent comprises toluene and said adhesive polymeric material comprises polystyrene present in an amount from about 5 to about 10% by weight.

* * * * *